BALANCE NETWORK

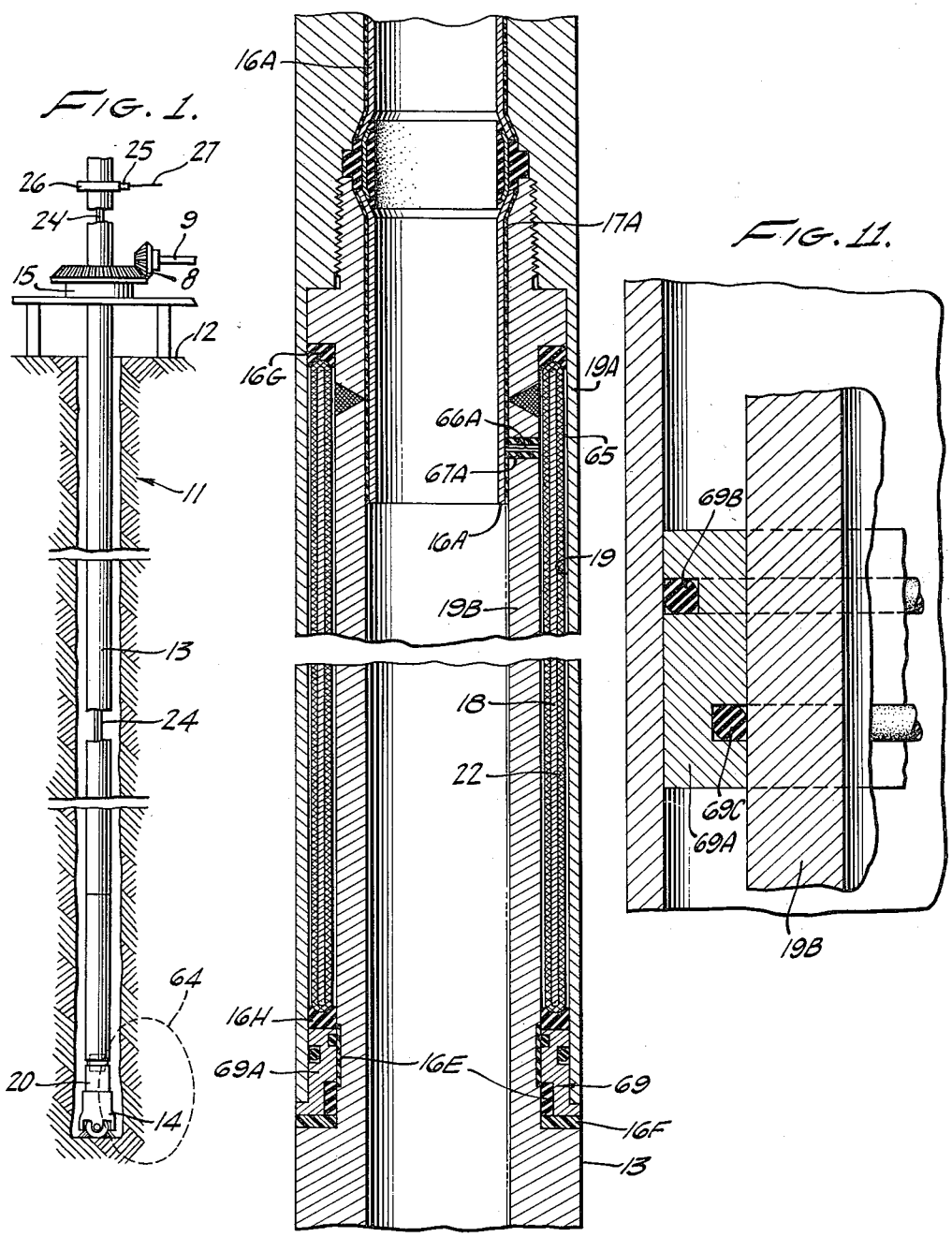

INVENTOR.
PHILIP W. MARTIN
BY Lyon & Lyon
ATTORNEYS

Feb. 26, 1963 P. W. MARTIN 3,079,549
MEANS AND TECHNIQUES FOR LOGGING WELL BORES
Filed July 5, 1957 6 Sheets-Sheet 3
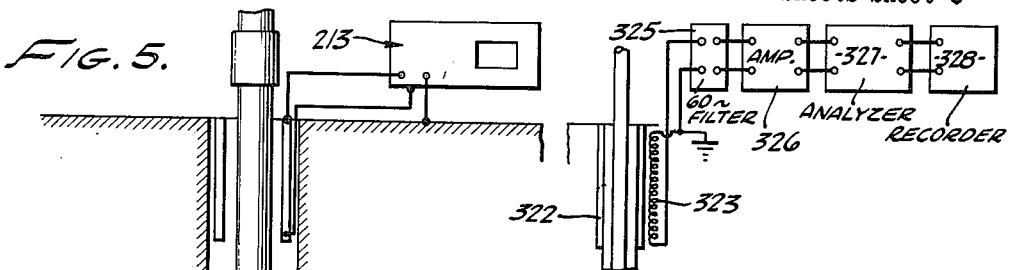
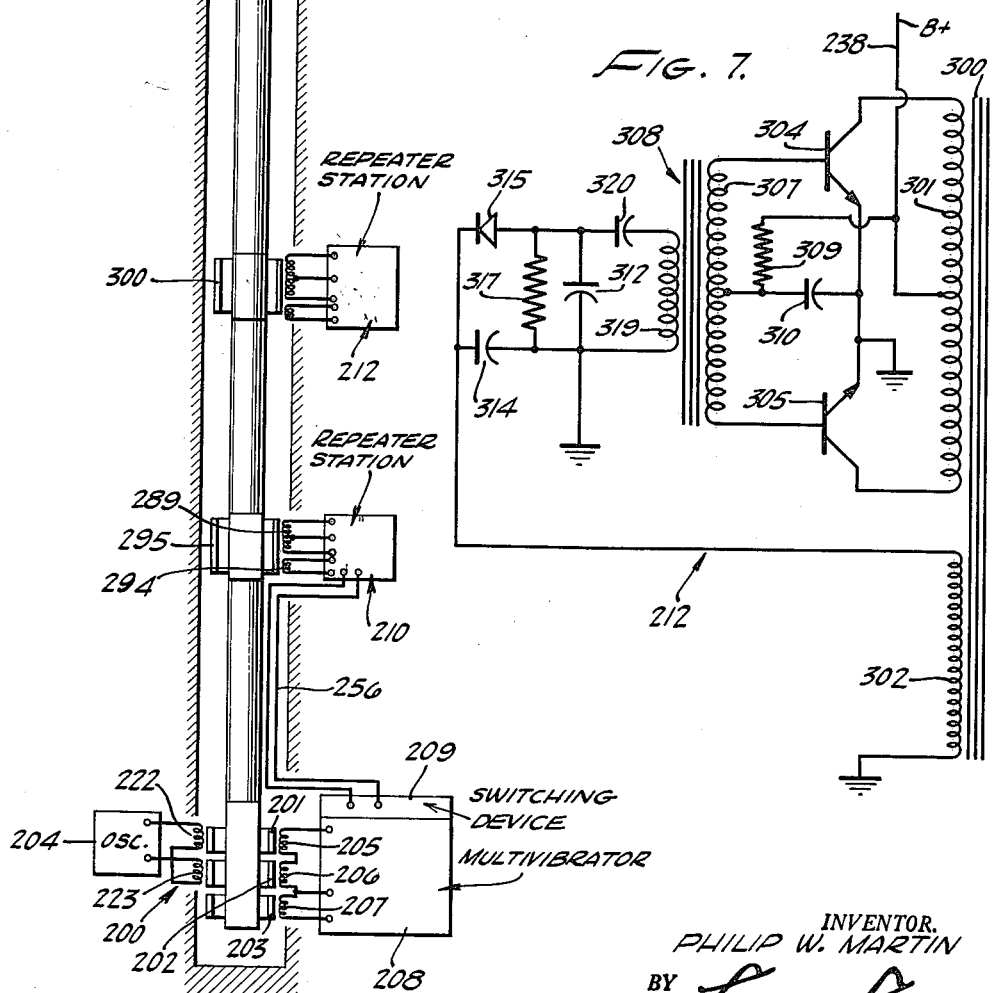
INVENTOR.
PHILIP W. MARTIN
BY Lyon & Lyon
ATTORNEYS

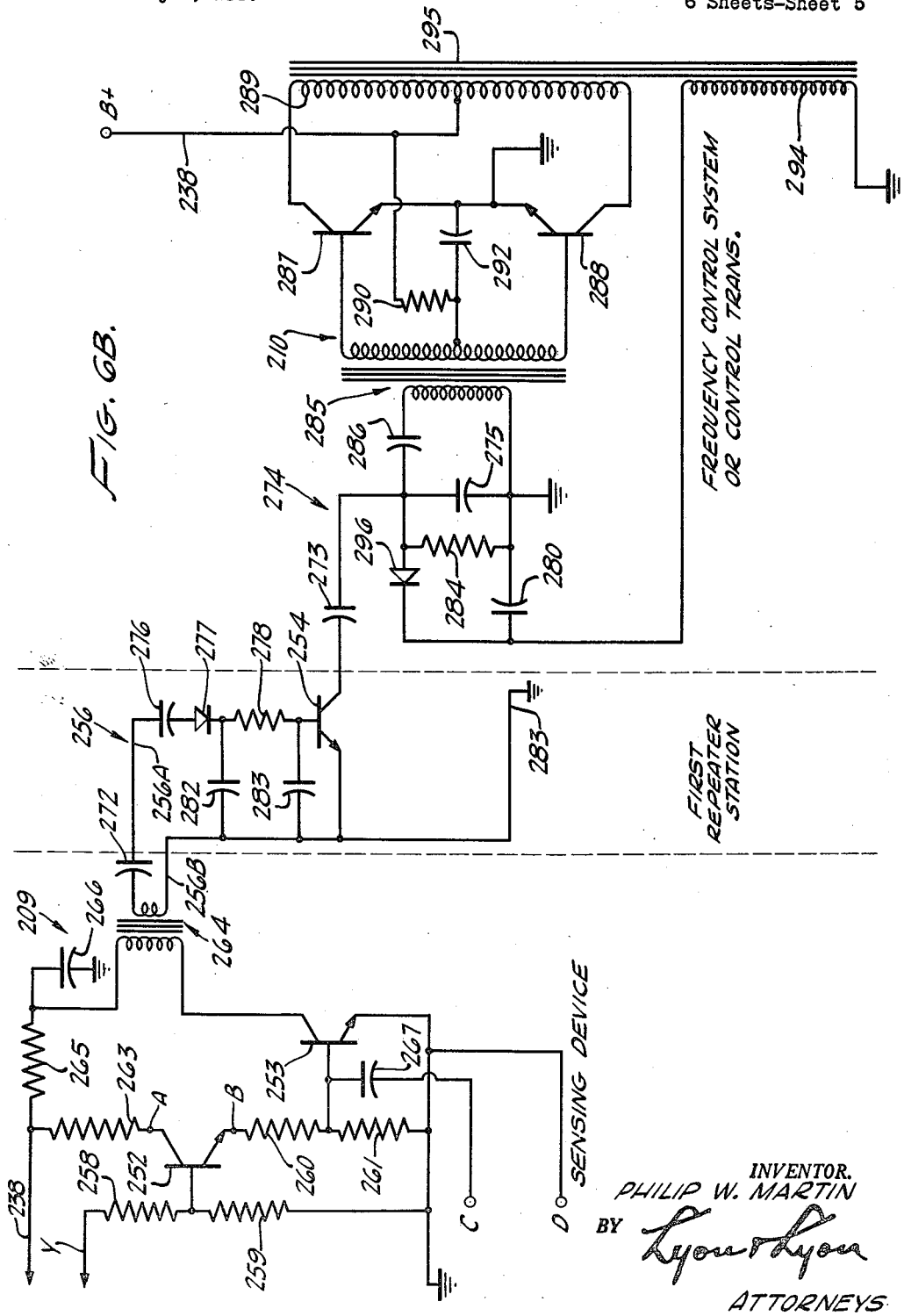

Feb. 26, 1963 P. W. MARTIN 3,079,549
MEANS AND TECHNIQUES FOR LOGGING WELL BORES
Filed July 5, 1957 6 Sheets-Sheet 6

INVENTOR.
PHILIP W. MARTIN
BY Lyon & Lyon
ATTORNEYS

United States Patent Office 3,079,549
Patented Feb. 26, 1963

3,079,549
MEANS AND TECHNIQUES FOR LOGGING
WELL BORES
Philip W. Martin, 1345 West Road, Whittier, Calif.
Filed July 5, 1957, Ser. No. 670,326
27 Claims. (Cl. 324—1)

The present invention relates to novel means for determining properties or characteristics of earth formations in a well while such well is being drilled. In its broader aspects, however, the invention is not limited to such applications, although it is particularly useful in such applications.

Various types of systems have heretofore been suggested and used for logging a well, that is, determining one or more characteristics of the formations penetrated by the bit while the well is being drilled. In accordance with the present invention, the characteristics of the formations are obtained electrically and this in general involves a determination of electrical resistance and the so-called "spontaneous potential." The term "spontaneous potential," as used herein, has reference to the potential or voltage which is present between the bit and the earth formations while the bore is being drilled. A determination of such spontaneous potential is considered desirable since it is based on the original condition of the formation prior to disturbance of such formation by liquid that may subsequently enter the bore. While the apparatus described herein is particularly useful in determining such spontaneous potential, other characteristics of the formation are also obtained either while drilling or after drilling, such as electrical resistance and the current which flows through such resistance as a result of the spontaneous potential. These desirable results are obtained using simple, practical and rugged constructions, and such features are obtained principally because the system does not involve insulators, which, due to their nature, are limited in their stress carrying ability.

It may be remarked that many different systems have been heretofore proposed for drill logging, but today there is no commercially successful system in the field. While many different arrangements have been tried with more or less success, perhaps the greatest difficulties encountered involve (1) the lack of a suitable information transmission system, and (2) the requirement of an insulating sub next to the drill bit to insulate it for purposes of measuring spontaneous potential.

The arrangements described herein provide new means and techniques whereby these two formidable difficulties, among others, are surmounted. Briefly, in order to eliminate the necessity of insulating the bit from the rest of the drill string, the present arrangements involve the measurement of the direct current produced at the bit by an element sensitive to the flow of current such as a saturable reactor or transformer. In certain embodiments of the invention, the information is transmitted without the use of a conducting cable that extends along the length of the drill pipe or by the use of repeater stations operating at various frequencies and without requiring very complex circuitry, as in some of the previously suggested transmission systems.

Transmission systems are incorporated herein which use only two transistors per stage, and information is conveyed in the form of changes in the transmission frequency.

While these two expedients used in surmounting the two previously indicated problems may appear simple, they are considered to be the solution to two very difficult and stubborn problems which have heretofore existed.

In general, the electrical system involves the use of a magnetizable core mounted on the drill string in close proximity to the drill bit so that electrical currents resulting from the spontaneous potential cause the core to be magnetized in different degrees depending upon the magnitude of such potential and/or current. The resulting condition of the magnetizable core is detected using simple means involving the application of an alternating current to a coil on such core and effectively measuring a harmonic of the alternating current, the magnitude of such harmonic varying in accordance with the magnetic field produced by that current which flows as a result of the spontaneous potential. In other words, the magnetic core is considered to be part of a magnetic amplifier or detector which has an output varying in accordance with that current which flows as a result of the spontaneous potential whereby spontaneous potential may be determined simultaneously with resistivity of the well formation.

It is therefore a general object of the present invention to provide means and techniques for accomplishing the above indicated results.

A special object of the present invention is to provide means and techniques for determining the potential between a drill bit and earth formations either while the bore is being drilled or while the bit is being withdrawn from the bore, or at any other time after the bore is drilled.

Another specific object of the present invention is to provide means and techniques whereby these results may be accomplished in a practical manner using simple and rugged equipment.

Another specific object of the present invention is to provide improved means and techniques whereby a magnetic amplifier placed adjacent the bit is energized and outputs are derived therefrom and transferred to the surface with a minimum number of conductors.

Another specific object of the present invention is to provide improved means and techniques for accomplishing the above results without the use of a stress-carrying insulator in the drill string.

Another object of the present invention is to provide improved means and techniques for transmitting to the surface, using repeater stations.

Another object of the present invention is to provide improved means and techniques whereby information is developed as to self or spontaneous potential and resistivity in terms of the "on" and "off" periods of a multivibrator.

Another object of the present invention is to provide improved sensing means which, if desired, may be connected to a conductor system built into a drill string as shown in the application of Ira J. McCullough entit'ed "Well Pipe With Insulated Electrical Conductor," Serial No. 670,327, filed July 5, 1957, now abandoned.

Another important object of the present invention is to provide means and techniques whereby spontaneous potential and resistivity of the well bore may be determined simultaneously.

The features of the present invention which are believed to be novel are set forth with particularity in the appended claims. This invention itself, both as to its organization and manner of operation, together with further objects and advantages thereof, may be best understood by reference to the following description taken in connection with the accompanying drawings in which:

FIGURE 1 represents in diagrammatic form a cross-section of the earth penetrated by a well with equipment associated therewith embodying features of the present invention.

FIGURE 2 is a sectional view illustrating the manner in which the magnetizable core is mounted in close proximity to the bit and differs from FIGURE 1 in that FIGURE 2 shows an optional arrangement for connecting the coil to the surface equipment.

FIGURES 5–8 illustrate another system embodying features of the present invention, FIGURE 6 being continued on two sheets of drawings as FIGURES 6A and 6B, with the circuitry on such two sheets being interconnected as indicated.

FIGURE 11 illustrates a modified sealing structure for the oil surrounded sensing toroid.

Figure 3:
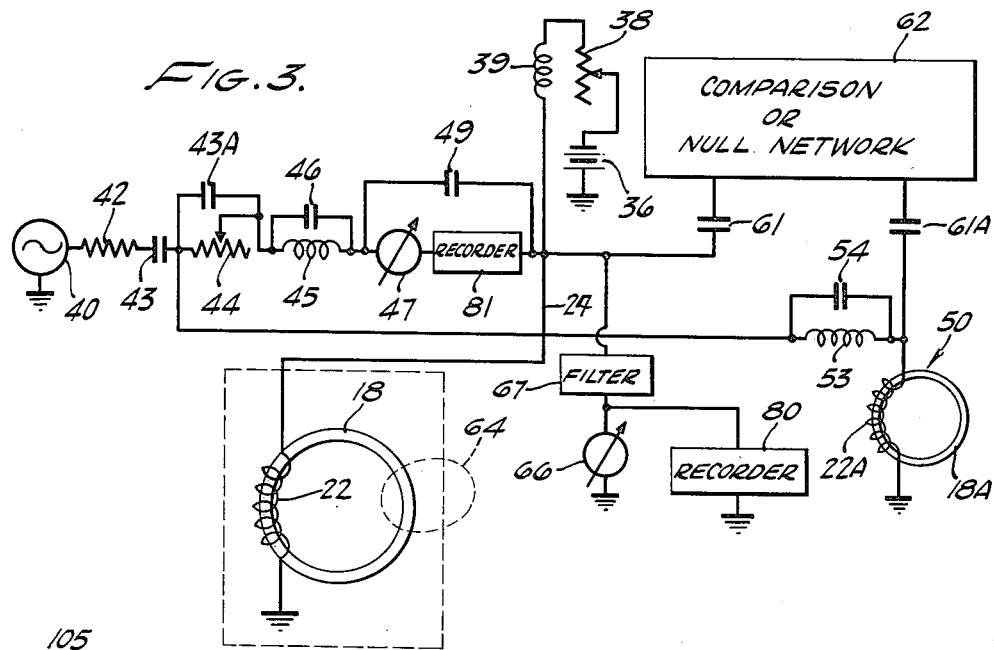
FIGURE 3 is a schematic diagram illustrating the electrical circuitry.

In FIGURE 1 a well 11 is shown penetrating various formations beneath the surface of the earth, such surface being indicated by the numeral 12. A drill string 13, carrying at the lower end thereof a drill bit 14, is lowered into this well. The entire drill string from the surface to the drill bit is in electrical contact at all times during the logging operation. At the surface the drill string is supported by conventional apparatus (not shown) and is rotated by a rotary table 15 driven by a bevel gear 8 through a shaft 9 attached to the drilling engine (not shown). All of this equipment is standard equipment used in rotary drilling.

It will be understood that the arrangement shown in FIGURE 1 includes a toroidal core 18, as illustrated in FIGURE 2, of ferro-magnetic material, for example, Silicon steel, Mu metal, Permalloy, or the like, serving as an element of a magnetic detector or amplifier, which is disposed within an annular pocket 19 defined by the parts 19A and 19B of the drill string 13. Such pocket is defined by sections of the drill string which are in close proximity to the drill bit, as indicated in FIGURE 1. The winding 22 is wound around the core 18, passing from inside to outside of the core on each turn. The manner in which the winding 22 is connected with surface equipment may take different forms and, indeed, a separate conductor 24, as shown in FIGURE 1, may be used or, instead of using a conductor cable, illustrated as 24 in FIGURE 1, the connecting conductor may comprise an inner conducting liner 16A inside the drill string and insulated therefrom in the manner illustrated in more detail in the aforementioned copending application of Ira J. McCullough. It is understood that the use of such inner conducting liner per se, forms no part of the present invention.

The sealing structure 69, essentially of metal, is insulated from the member 19B by the interposed insulation 16E and 16F. Oil resistant rubber rings 16G and 16H are on opposite ends of the toroid for cushioning. One lead of the coil or winding 22 is "grounded" at 65 to the member 19A, which is electrically connected to the drill string 13. The other lead 66A of the coil 22 extends through the fluid tight insulator bushing 67A and contacts the liner sleeve 16A, which is of conductive material and which is insulated from the drill string 13 by the interposed insulating layer 17A. The conducting liner 16A on each drill pipe section is connected, one to the other, throughout the full length of the drill string, using the means and techniques described in the aforementioned copending application of Ira J. McCullough.

The parts 19A and 19B, which define the pocket, may be formed of magnetic or nonmagnetic material. Nonmagnetic material is preferred since otherwise the pocket 19 would constitute, in effect, a discontinuity in the iron and may cause a discontinuity in the magnetic fields, which may or may not introduce difficulties. The core 18 may have a length of approximately two feet and the sealing structure 69 and insulator 67A are sufficiently tight so that the pocket 19 retains the oil which is filled in the pocket prior to assembly. By filling the pocket 19 with oil and providing cushions 16G and 16H, the core and winding thereon are protected to some extent from stress due to vibration. The insulating members 16E and 16F serve, when the surrounding members are of magnetizable material, to prevent a magentic short circuit around the toroid.

In the modified sealing arrangement shown in FIGURE 11, the sealing structure 69 of FIGURE 2 is replaced by a "floating" seal 69A of insulating material in which there are recessed O rings 69B and 69C for purposes of minimizing pressure differentials.

The inner conducting liner 16A is connected to a slip ring and brush assembly in the same manner as is the comparable conductor cable 24 in FIGURE 1.

As illustrated, one terminal of the coil 22 is connected to the drill string and the other terminal of the coil 22 is connected either to the conducting liner sleeve 16A or to the conductor cable 24 which passes upwardly and internally of the drill string 13 to the surface, at which the other end of the cable or liner sleeve is connected to the insulated slip ring 26 (FIGURE 1), having bearing against it the stationary brush 25. Such brush 25 is in constant engagement with the slip ring 26 to which the conductor 27 is electrically connected so that at all times, even while drilling, there is a path for the flow of current. Such path extends from conductor 27 to brush 25, slip ring 26, either cable 24 or liner sleeve 16A, through coil 22 and to the grounded connection between the coil 22 and the drill string, with the drill string itself constituting one conductor.

The coil 22 is energized as presently described in connection with FIGURE 3, with both a continuous or D.C. current and an alternating or A.C. current, such currents flowing through the common conductor 24, with the D.C. current being used primarily to establish a bias for the core structure 18 and with the alternating current being used in development of a signal, i.e., a harmonic of such alternating current which, as described presently, is used in determination of spontaneous potential and either the fundamental or a harmonic or a function thereof of the alternating current is used in determining the resistance of the formation engaged by the drill bit.

Continuous current for the coil 22 is supplied from the D.C. voltage source 36 which has one of its terminals grounded and the other one of its terminals connected to the conductor 24 through the serially connected adjustable resistor 38 and the choke coil 39 which effectively isolates the source 36 from the alternating current supply 40 and harmonics thereof. The resistor 38 is adjusted so that the magnetic core 18 is properly biased or neutralized for most efficient operation.

Alternating current is supplied to the coil 22 from the A.C. source 40 which has one of its terminals grounded and the other one of its terminals connected to the conductor 24 through a series circuit which includes in turn the following elements: the current limiting or regulating resistor 42, the blocking condenser 43, adjustable resistor 44 shunted by condenser 43A, the harmonic filter comprising the coil 45, which is connected in parallel with condenser 46, and a suitable ammeter 47 and recorder 81 for indicating the flow of current. If desired, a suitable condenser 49 is shunted around the meter 47 and recorder 81 of sufficient magnitude to allow only a small amount of alternating current to flow through the meter 47.

A magnetic structure 50, which is substantially identical in physical dimensions and magnetic properties, is above the earth's surface to provide a matching structure. Such magnetic structure comprises the toroidal core 18A and winding 22A which is wound on the core 18A in like manner as is the winding 22 on core 18. A continuous current is supplied to the coil 22A through a series circuit which includes in turn the following elements: battery 36, adjustable resistor 38, choke coil 39, recorder 81, meter 47, coil 45, adjustable resistor 44 and the coil 53 which is shunted by condenser 54 to provide a harmonic filter.

An alternating current is also supplied to the coil 22A from source 40 through the series circuit which includes in turn the following elements, namely, source 40, current limiting or regulating resistor 42, condenser 43, the harmonic filter 53, 54 and the coil 22A.

The alternating current thus supplied to coil 22A, on the one hand, and coil 22, on the other hand, from source 40 is, for all practical purposes, of the same intensity to preserve the balanced or matched condition of the two magnetic core structures. To achieve this substantial identicalness, the resistor 42 is relatively large in comparison to the series resistance of resistor 44, coil 45, ammeter 47, recorder 81 and the resistance of the long cable 24.

It is thus noted that both a continuous current and an alternating current are supplied to each of the coils 22 and 22A. In general, the continuous current supplied to the coils 22 and 22A conditions or establishes certain magnetic properties in the core structures 18 and 18A. Additionally, the magnetic condition of core 18 is influenced or determined also by the magnetic flux produced by earth or formation currents adjacent the bit 14 and produced by the spontaneous potential or voltage between the bit and such formations. Such currents may, for example, be considered to flow in the paths indicated by the path 64 in FIGURE 1. It is noted that such path includes the collar 20 and bit 14, which, of course, are of conductive material so that such collar 20 and bit 14 may be considered to be a portion of a turn of a winding (which includes also the earth formations) that encircles the core 18. The earth current flowing in such "single turn" also influences, as mentioned above, the magnetic condition or properties of the magnetic core structure 18 in such a manner that a greater or lesser harmonic component of the alternating current flowing through coil 22 is developed depending upon the intensity of the current flowing through such single turn.

The apparatus, by thus being rendered sensitive to the production of a harmonic which varies in accordance with earth current, is used to determine, as mentioned in more detail later, the spontaneous potential and resistance of the formation in accordance with the intensity of the fundamental and harmonics thus developed.

Similarly, a harmonic of the alternating current is developed in winding 22A in accordance with the magnetic condition or properties of core 18A as established by adjustment of the calibrated resistor 44.

The harmonics thus developed across the terminals of windings 22 and 22A are applied respectively through coupling condensers 61 and 61A to a comparison or null network 62 which serves to indicate the differences between such harmonic voltages applied thereto through condensers 61 and 61A.

In accordance with one mode of operation, the calibrated resistor 44 is adjusted so that such harmonic voltages are indicated in the network 62 as being equal; and in such case the magnitude of such calibrated resistor 44 is a measure of the earth current flowing through the single turn which comprises the earth formations and the collar 20 and bit 14, such single turn being represented schematically in FIGURES 1 and 3 by the loop 64. When the network 62 is thus balanced, the readings from the voltmeter 66, which measures the intensity of the fundamental or a harmonic gives a value of formation resistance (R). The reading from resistor 44 is calibrated in terms of earth current (I). From these two values, using Ohm's law ($E=IR$), the formation spontaneous voltage (E) is calculated.

For such purposes, the voltmeter 66 may be calibrated directly in terms of resistivity and, if desired, a high pass or band pass filter 67 which passes only the desired harmonic may be interconnected with the ungrounded terminal of voltmeter 66 and the lead 24.

Instead of using this so-called constant harmonic voltage balancing system, the system may be balanced for constant current. In such case, the current through coil 22A is maintained constant and determinations are made in accordance with the difference in voltage as measured by the comparison network 62, such difference in voltage in such case being a measure of the current flowing through the loop 64 and the formation resistance being read on voltmeter 66 as previously.

It is noted that the core 18 is in the well and the core structure 18a is at the surface so that consideration is required to be given to the difference in temperature at these two locations. The core structure 18A and winding 22A may be of such materials that their properties are not influenced by temperature and/or such core structure 18A may be mounted in a temperature controlled chamber or bath having a temperature which is substantially equal to temperature in the well at which the core 18 is located.

On the other hand, both cores 18 and 18A may be mounted side by side in the well, but in such case the electrical circuitry is different. Such modifications requires two windings on each core 18 and 18A, i.e., a continuous current winding on each core 18 and 18A, as well as a separate alternating current winding on each core 18 and 18A. In such case the continuous current windings on both cores are connected with such magnetic polarity that the continuous field from one substantially neutralizes or bucks out the field of the other, whereas, on the other hand, the alternating current windings on each core are connected in magnetic series aiding relationship so that both the fundamental magnetic flux and, of course, the harmonic magnetic flux aid one another. Various control circuits may be associated with such continuous and alternating current windings for measuring the harmonic voltage to achieve a measure of the formation resistance and formation current flow through a single loop comprising the collar 20 and bit 14 from which formation spontaneous potential may be determined using Ohm's law.

It is considered unnecessary to go into detail as to the causes of voltage differences between the drill string and, more particularly, the bit and the earth formations, but in general such voltage may be due to one or more of the following factors, namely, electro-osmosis, streaming potential, tribo electricity, electro-mechanical phenomena, polarization, depolarization, and thermocouple effects. A determination of spontaneous potential is considered particularly desirable in logging oil wells, since such potential measured while drilling the well is more truly a measure of the condition of the formations in their original state before conditions have been altered due, for example, to the flow of fluids such as water or salt water into the bore. Indeed, the determination of spontaneous potential while the well is being drilled and at intervals subsequent thereto allows the development of logging information which is considered invaluable. It is contemplated that spontaneous potential (as well as resistances thus determined) be recorded during drilling and when and as the drill string is being raised and lowered in the process of adding another stand of, for example, ninety feet to the drill string or even shorter lengths of pipe.

It will be noted from the above that an important concept of the present invention involves the use of a portion of the drill string itself as a portion of an electrical "winding" which embraces a magnetic core so that the current which flows through such winding and which is indicative of conditions in the formation alters a magnetic characteristic of the core; and the resulting condition of the core is determined to indicate the condition of the formation. While, in this process, it is preferred to measure a harmonic of an alternating current which flows through a winding on the core, it is understood that broadly other means may be used to indicate the resulting conditions of the core as affected by formation currents, for example, changes in the magnetic core may be indicated in terms of changes in the intensity of the alternatnig current flowing through the coil. Further, changes in the magnetic properties of the core may cause the modulation of a so-called constant frequency carrier wave and the resulting modulation component is then detected and used as an indication of the conditions, i.e., voltage, resistance and current in the formations that influence the magnetic condition of the core.

It is understood that the expression "characteristic of a magnetic core," as used herein, has reference to well known properties of a magnetic circuit such as, for example, permeability, degree of magnetic saturation, and the like, any one of which may be primarily dependent upon to produce an indication of the current which flows through the single turn comprising the formation and a portion of the drill string.

If desired, recording means may be associated with the equipment for making permanent recordation such as, for example, the recorder 80, which is connected in parallel with the voltmeter 66, and the recorder 81, which is serially connected with the ammeter 47, to record voltage and current respectively.

The recording medium of the recorder 81 is synchronized with the movement of the drill string in conventional manner or the medium may be moved other than as a function of drill bit position.

If desired, inductor 39 may be replaced by a resistor.

Figure 4:
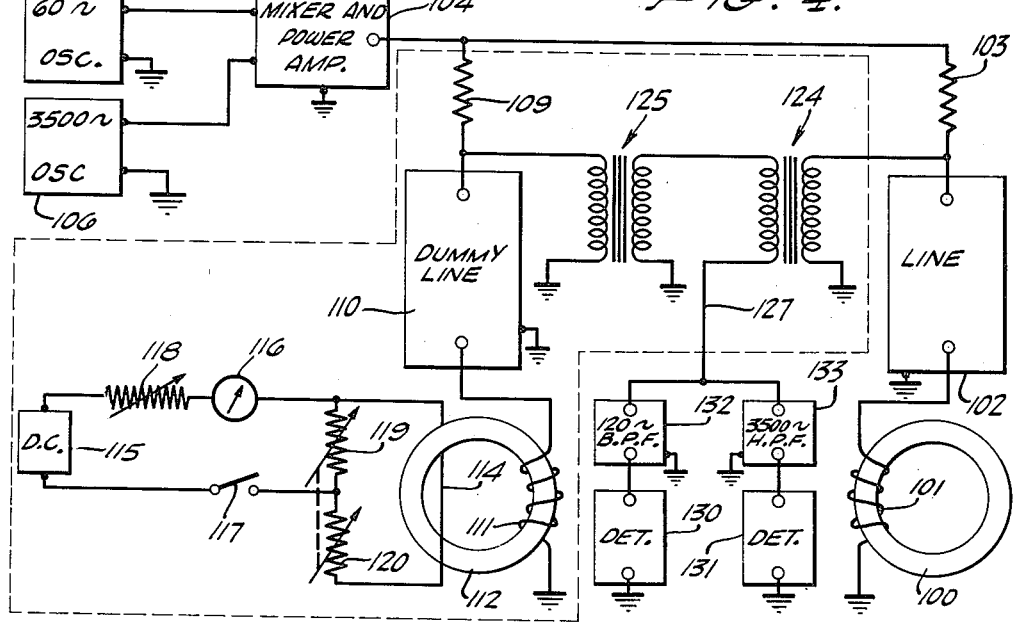
FIGURE 4 illustrates a modification also embodying features of the present invention.

In FIGURE 4, a magnetizable or saturable core 100 (like core 18 in FIGURE 3) is disposed, as shown in the other figures, in the well bore near the bit and has a winding 101 thereon having one terminal grounded, i.e., connected to the drill string, and the other terminal connected to a conventional line or an insulated coductor, as shown in the aforementioned McCullough application. This line conductor is represented at 102 and is connected, at the surface, to one terminal of resistor 103, the other terminal resistor 103 being connected to the output of the combined mixer and power amplifier stage 104 which serves to mix and amplify oscillations of approximately or in the order of 60 and 3500 cycles supplied to the input terminals thereof from the 60 cycle source or oscillator 105 and 3500 cycle source 106. It is understood that the frequencies mentioned are cited as examples and that other frequencies may be used, if desired, and that such frequencies may be shifted or applied alternately.

The output of stage 104 is applied also through resistor 109 to a similar comparison network, located at the surface, which includes a dummy line 110 (having the same electrical characteristics as line 102) and a winding 111 on magnetizable core 112 (having, in general, the same characteristics as core 100). The core 112, as shown, includes an additional single turn winding 114 connected to a D.C. source 115 from which a calibrated amount of current, as measured on ammeter 116, may flow for simulating the flow of earth currents corresponding to that earth current which flows, in a single turn path, around core 100. The calibration circuit, as shown, includes a calibrated series adjustable resistor 118 which is connected in series with source 115, switch 117, meter 116 and adjustable calibrated resistor 119. Calibrated adjustable resistor 120 is connected in series with the single turn 114 and resistor 119. Resistors 119, 120 may be adjusted in unison as indicated.

The signals derived from windings 101 and 111, and after transmission through the corresponding lines 102 and 110, are applied to a balancing network comprising transformers 124 and 125. The primary windings of transformers 124 and 125 have their ungrounded terminals connected respectively to lines 102 and 110. The secondary windings of transformers 124 and 125 are connected in series electrically but so that the voltages induced therein are in opposition whereby voltages corresponding to the difference in such induced voltages appear on lead 127. This lead 127 is connected to detectors 130, 131 through a corresponding 120 cycle band pass filter 132 and a 3500 cycle band pass or high pass filter 133 so as to assure separation of signals derived, on the one hand, from the 60 cycle source 105 and, on the other hand, from the 3500 cycle source 106.

In general, the resistivity of the well bore is measured in terms of the high frequency current of, for example, 3500 cycles, detected in detector 131, and spontaneous potential is measured in terms of a harmonic current of, for example, 120 cycles which is indicative of saturation produced by the D.C. component in the drill collar. By adjusting resistors 119 and 120 simultaneously so that the signal shown by detector 131 is effectively nulled, the sum of resistances of resistors 119 and 120 will be the resistance (R) of the bore hole. The sum of resistances of the D.C. source 115, resistor 118 and ammeter 116 is much larger than the resistance of resistor 119. Then the resistor 118 is adjusted so that the signal at detector 130 is effectively nulled. The value of the current (I) through the drill pipe will be some portion of the current read by ammeter 116, depending on the ratio of values of resistances of resistors 119 and 120. By using Ohm's law ($E=IR$), the self potential (E) is calculated.

The arrangement shown in FIGURE 4 which employs two different frequencies, of different magnitude, and in nonharmonic relationship to each other, allows accurate measurements of resistivity and spontaneous potential even when a line of poor transmission line quality is used and the core is operated near the saturation point. The characteristics of the line may be determined by the amount of 60 cycle current or voltage required to saturate the line.

Core 100 may be about two feet in length and winding 101 may have about ten turns. The above values are dependent on the type of line used and other parameters of the system and should be chosen to give optimum operation. Preferably, the core is made as large as practical so as to obtain a high impedance for measurements of resistivity.

In the arrangement shown in FIGURE 5, the signals representative of spontaneous potential and resistance are transferred to the surface through repeater stations. The sensing station 200 is near the bottom of the drill pipe and, in general, comprises three toroids 201, 202 and 203, driven by an oscillator 204. The two toroidal secondary windings 205 and 206 are connected in series to produce a signal which is a function of, or representative of, self or spontaneous potential; and a signal is derived from the third secondary winding 207, which is a function of the resistivity. These signals, obtained from windings 205, 206 and 207, are fed into a multivibrator 208 having a normal frequency in the order of about 0.05 cycle per second or an "on" time in the order of about ten seconds and an "off" time in the order of about ten seconds. The "on" and "off" time is controlled by the signals from the toroids. The output of the multivibrator 208 is connected to a switching device 209 which sends time signals up the drill pipe.

The first repeater station 210, which may also be incorporated in the same housing 299, includes a stable oscillator whose frequency is controlled by capacitors. This station has two frequencies which are changed by switching one capacitor in and out of the circuit, as described in connection with later numbered figures. Such capacitor is switched in and out of the circuit by the signal coming up out of the sensing station 200. The rest of the repeater stations, represented by the repeater station 212, include unstable oscillators which will lock in with the particular oscillator frequency of the first repeater station 210 so as to transmit two time signals up to the top of the pipe at the surface. The surface equipment 213 comprises means for obtaining signals from the pipe and for changing the time signals back to amplitude measurements whereby two logs may be obtained, one being a log of self potential and the other being a log of resistivity. The particular circuitry whereby these results are obtained is now described in connection with FIGURES 6A and 6B, FIGURE 7 and FIGURE 8.

Figure 6A:
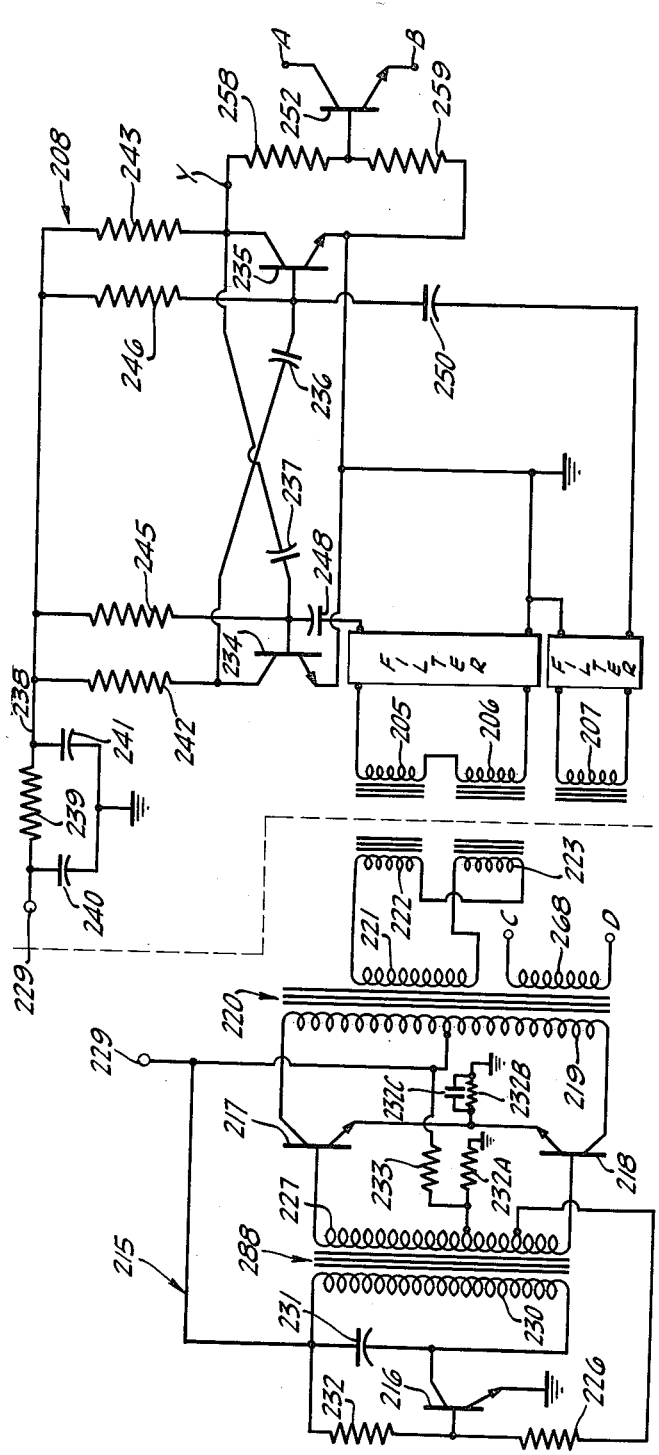

In FIGURE 6A the driving oscillator 215 comprises three transistors 216, 217 and 218. Transistor 216 is used in a feedback system to produce a wave of about 40 cycles and the other two transistors 217 and 218 are used as push-pull drivers that supply energy to the center tapped primary winding 219 of transformer 220. The collectors of transistors 217 and 218 are connected to the primary winding of transformer 220. The secondary winding 221 of transformer 220 is serially connected with the toroidal windings 222 and 223, which toroidal windings are connected in series opposition with respect to the manner in which the toroids are placed around the pipe. The secondary windings 205, 206 are connected in series aiding to obtain a second harmonic signal which is representative of, or a function of, the self or spontaneous potential. The amplitude of such signal is dependent upon the current which flows through the pipe. Such current which flows through the pipe is a function of the self potential of the formation and also a function of the resistivity of the formation. The third secondary toroidal winding 207 has an output which is a function of the resistance of the formation only.

The base of the transistor 216 is connected through resistor 226 to a tap on the secondary winding 227 of transformer 228. The emitter is grounded. The collector of transistor 216 is connected to the ungrounded B+ lead 229 through the primary winding 230 which is shunted by condenser 231. Resistor 232 is connected between the collector and the B+ lead 229.

The outside terminals of the secondary winding 227 are connected respectively to the base of transistors 217 and 218, and the center tap of such winding is returned to ground through resistance 232A. A resistance 233 is interconnected between the center taps of windings 227 and 219. The center tap of winding 219 is connected to the B+ lead 229. The emitters of transistors 217 and 218 are returned to ground through resistor 232B which is shunted by condenser 232C. It is understood, of course, that the polarities are dependent on the type of transistor used.

The multivibrator stage 208 comprises two transistors 234 and 235. The collector of transistor 234 is connected to the base of transistor 235 through condenser 236. Likewise, the collector of transistor 235 is connected to the base of transistor 234 through condenser 237. The emitters of both transistors 234 and 235 are grounded. High voltage, more or less than 45 volts, appears on lead 238, which is connected to the B+ lead 229 via the isolation or filter network comprising the series resistor 239 and shunt condensers 240 and 241. Such lead 238 is connected to the collectors of transistors 234 and 235 through resistors 242 and 243 respectively. Also, such lead 238 is connected to the bases of both transistors 234 and 235 through resistors 245 and 246. One terminal of the series connected winding 205 is connected via condenser 248 to the base of transistor 234 and the other terminal of such series connected windings 205 and 206 is grounded. Winding 207 has one of its terminals grounded and the other one of its terminals connected via condenser 250 to the base of transistor 235.

It is thus observed that the output from the three toroids is fed into the multivibrator 208. Such multivibrator 208 with zero signal has a natural or normal "on" and "off" time of approximately ten seconds each. These signals fed into the multivibrator change the "on" and "off" time. The "on" time represents resistance and the "off" time represents self potential. The multivibrator output controls two transistors 252 and 253 (see FIG. 6B) connected in cascade and which serve generally as one type of switching device 209 (FIGURE 5) for switching a signal to the transistor 254 in the first repeater or control transmitter station 210. These transistors 252 and 253 serve in turning "on" and "off" a signal which is sent up a conductor 256 (FIGURE 5) to the first repeater station 210 to control a switching device in that repeater station.

More specifically, as shown in FIGURES 6A and 6B the two transistors 252 and 253 are interconnected, with the base of transistor 252 being connected to the junction point of resistors 258 and 259 which are connected in a voltage dividing circuit with one terminal of resistor 259 being grounded and with one terminal of resistor 258 being connected to the collector of transistor 235. The emitter of transistor 252 is returned to ground through the serially connected resistors 260 and 261, having their junction point connected to the base of transistor 253. The collector of transistor 252 is connected through resistor 263 to the lead 238. The emitter of transistor 253 is grounded. The collector of transistor 253 is connected to the lead 238 through the primary winding of transformer 264 and isolating resistor 265 which has one of its terminals by-passed to ground via condenser 266. A signal of approximately 40 cycles is applied between the base and emitter of transistor 253 and such signal is obtained from the secondary winding 268 of the oscillator output transformer 220, such signal being applied to the base of transistor 253 via condenser 267.

During a portion of a cycle of operation of the multivibrator, the transistor 253 is rendered ineffective to transfer the signal from winding 268 to the primary winding of transformer 264. This corresponds to the "off" time of the multivibrator, since at that time the transistor 253 is biased beyond cut-off. However, during the "on" time of the multivibrator, the transistor 253 is rendered effective to transfer the oscillations from winding 268 to the primary winding of the transformer 264.

The secondary of transformer 264 has its signal applied to conductors 256A and 256B via condenser 272. This signal, when it is present, serves to switch in a frequency determining condenser 273 of the oscillation network 274 in the first repeater station 210.

The transistor 254 serves essentially as a switching device for connecting the condenser 273 in parallel with another frequency determining condenser 275.

For these purposes, the conductor 256A is connected to the base of transistor 254 via condenser 276, diode 277 and resistor 278. Conductor 256B is connected to the emitter of transistor 254 and also to ground. Condenser 282 is connected between conductor 256B and the junction point of elements 277 and 278. Condenser 283 is connected between conductor 256B and the base of transistor 254.

Condenser 275 is shunted by resistor 284 and the ungrounded terminal of condenser 275 is connected to the ungrounded terminal of the primary winding of transformer 285 through condenser 286. The center tapped secondary winding of transformer 285 has its outside terminals connected respectively to the base electrodes of transistors 287 and 288, having their emitters grounded. The collector electrodes of transistors 287 and 288 are connected respectively to the outside terminals of the center tapped toroidal winding 289 which has its center tap connected to the B+ lead 238. The center taps of the toroidal winding 289 and the secondary winding of transformer 285 are interconnected by resistor 290. Condenser 292 is connected between the center tap of the secondary winding of transformer 285 and ground. A second winding 294 is wound on the toroidal core 295 and serves to provide a feedback voltage to sustain oscillations, such winding 294 having one of its terminals grounded and the other of its terminals connected to the ungrounded terminal of condenser 275 through the diode 296.

The oscillation network 274 in the first repeater station 210 is thus capable of generating stable oscillations at one of two different frequencies. When the transistor 254 is rendered conductive, such oscillations are at a relatively low frequency and when such transistor 254 is nonconducting, the oscillations are at a higher frequency. The first repeater station may be located from the sensing station containing the multivibrator at a distance of a few feet or in the same sub or at much greater distances. The next repeater station 212 may be separated from the first repeater station a distance of, for example, 30 feet or closer depending upon conditions, particularly the magnetic mass of the drill collar. The coupling between the first repeater station and the next repeater station is by electromagnetic field established by the toroidal core 295, and such coupling involves the flow of currents in the drill pipe that flow through the drill pipe and the adjacent formations. In other words, this system obviates the necessity for separate conductors between the first repeater station and the next repeater station and any other repeater station which may follow such next repeater station.

The next and other upwardly positioned and spaced repeater stations each comprise relatively nonstable oscillators having the circuitry shown in FIGURE 7.

In FIGURE 7, the toroidal core 300 encircles the drill pipe in the same manner as do the other toroidal cores. Such core 300 includes a main center tap winding 301 and a feedback coil 302. The transistors 304 and 305 have their collector electrodes connected respectively to the outside terminals of winding 301 and their emitters grounded. The base electrodes of such transistors are connected to the outside terminals of the secondary winding 307 of transformer 308. The center taps of windings 301 and 307 are interconnected by resistor 309. A condenser 310 is connected between the center tap of winding 307 and ground. The ungrounded terminal of winding 302 is connected to the ungrounded terminal of the condenser 312 through diode 315 and also returned to ground through condenser 314. Resistor 317 is connected in shunt with condenser 312. The primary winding 319 of transformer 308 has one of its terminals grounded and the other one of its terminals connected through condenser 320 to the ungrounded terminal of condenser 312.

The oscillation network shown in FIGURE 7 is unstable and free running in that it oscillates in a band of frequencies and locks in at the particular frequency of oscillations developed in the first repeater station. Such oscillation network in repeater station 212 is capable of operating at either one of the two frequencies at which the first repeater station 210 oscillates. The information is thus conveyed to the surface in terms of two oscillation frequencies each of which persists for a time determined by the controlled "on" and "off" periods of the multivibrator stage 208. Such oscillations are transmitted by induction to surface equipment shown in FIGURE 8.

In FIGURE 8, a toroidal core 322 is below the surface of the ground and encircles the pipe string and has a winding 323 thereon. One terminal of such winding is grounded and the other terminal is connected to the ungrounded input terminal of a 60 cycle filter 325. The signals at the output of the filter 325 are amplified in stage 326 and then applied to analyzing means 327 which preferably has associated therewith the recorder 328 to obtain a permanent log.

The analyzing means 327 is responsive to the two different frequencies established at the first repeater station and preferably includes two different tuned circuits tuned to such two different frequencies. These two frequencies thus selected in the analyzing device by the corresponding tuned circuits are preferably applied to amplifiers in different channels which terminate in rectifying devices whereby unidirectional voltages are developed for operating the recorder 328. It will be noted that the actual measurement represented by the "off" time which represents self potential is actually a measurement of current through the drill bit and drill collar. This current is a function of the self potential and resistance of the formation. Thus the self potential may be derived from the resistivity and current measurements. This may be done electronically by the analyzer 327 so that the recorder 328 will give continuous logs of resistivity and self potential. One of such unidirectional voltages is thus indicative of self potential and the other is indicative of resistivity of the formation at the drill bit.

Thus, in the arrangement illustrated in FIGURE 5, and subsequent figures, the spontaneous potential and resistivity produces changes in the "on" and "off" time of the multivibrator, the resistivity affecting the "on" time and the spontaneous potential affecting the "off" time. The periodicity or so-called wave length of one cycle of multivibrator operation may, in some cases, be substantially constant or vary in accordance with these two factors. During the "on" time of the oscillator, a signal derived from the original source of oscillations is gated on and used to effect a switching operation at the first repeater station, i.e., to switch in a frequency determining condenser connectable in a stable oscillator at the first repeater station. This oscillator in the first repeater station is of essentially the same design as in all subsequent repeater stations except for the resistance and capacity values in the frequency controlling section. Each oscillator comprises essentially two transistors connected in push-pull fashion to a toroid which surrounds the drill pipe. Positive feedback from a secondary winding is taken and fed into a frequency controlling system which then feeds another transformer which drives the transistors. In the first repeater station, the parameters are such that the frequency is controlled by a capacitor which is switched in and out of the circuit by the signal from the sensing station. The frequency range may, for example, be from 10 to 20 cycles. The output of the repeater station is then fed up the pipe as follows. The toroid driven by the oscillator is around the pipe. The pipe acts as one turn around the toroid. The succeeding repeater stations are built likewise except that the frequency controlling system is set so that they can be controlled by the signal coming up the pipe which is picked up by the secondary winding on the associated toroid. Thus, all the repeater stations which include unstable oscillators (except the first repeater station) will follow the signal which the first oscillator repeater station is sending up the pipe. In this manner attenuation of the signal as it goes up the pipe is lessened. The signal, which is a time duration signal, is detected on the surface.

Figure 9:
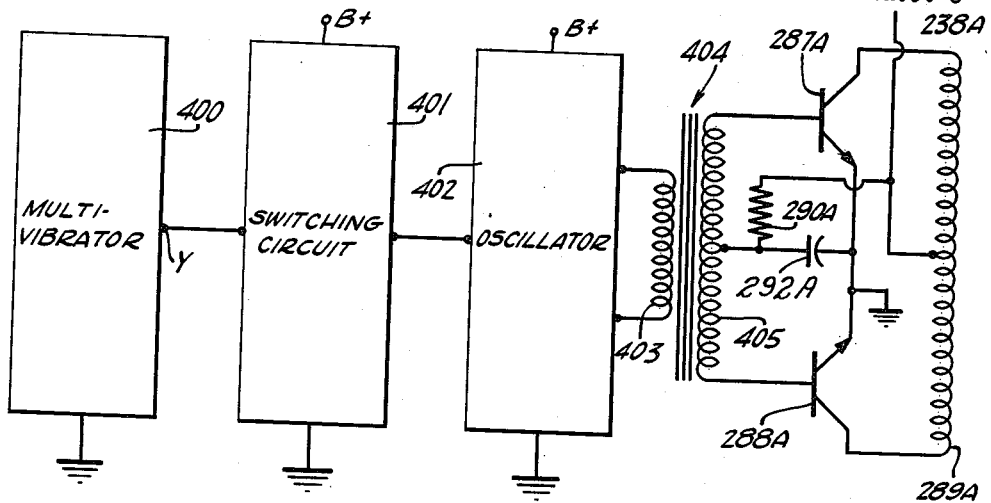
FIGURES 9 and 10 illustrate in electrical schematic form other systems embodying features of the present invention.

In the modified arrangement shown in FIGURE 9, a signal is derived from the multivibrator 400 at point Y and fed into a switching circuit 401 which is controlled by the output of the multivibrator so as to turn on and off the oscillator 402. The oscillator has its output connected to the primary winding 403 of transformer 404.

The center tapped secondary winding 405 has its outside terminals connected respectively to the base electrodes of transistors 287A, 288A, having their emitters grounded. The collector electrodes of transistors 287A, 288A are connected respectively to the outside terminals of the center tapped toroidal winding 289A which encircles the drill pipe, as illustrated in the previous figures, and which has its center tap connected to the B+ lead 238A. The center taps of the toroidal windings 289A and the secondary winding 405 are interconnected by resistor 290A. Condenser 292A is connected between the center tap of the secondary winding of transformer 404 and ground.

The circuitry as shown in FIGURE 9 serves as a transmitter sending out a signal of about 200 cycles when the multivibrator is on and sending out no signal when the multivibrator is off.

Figure 10:
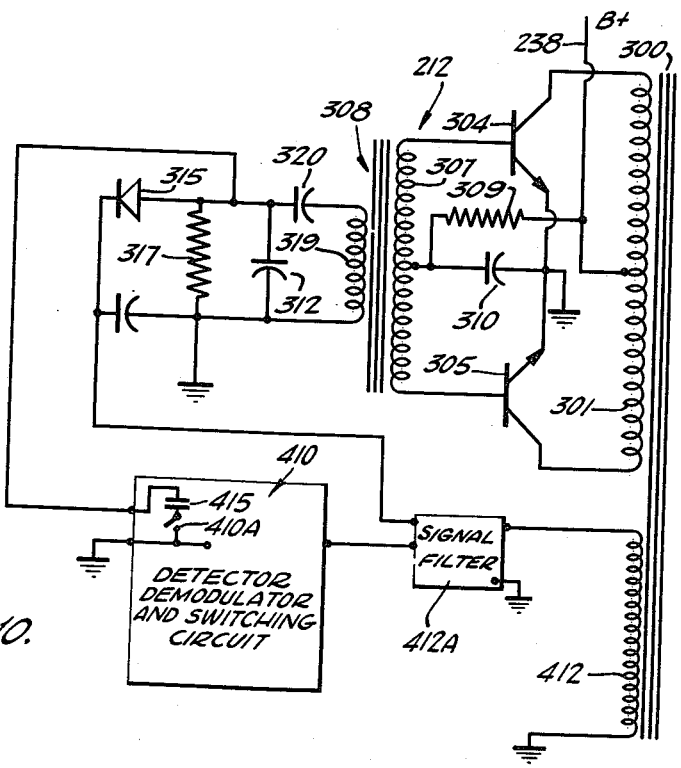

The repeater station shown in FIGURE 10 is magnetically associated with the transmitter shown in FIGURE 9. Such first repeater station has a detector and demodulator 410 which actuates a switching network, included in the stage 410 when the 200 cycle not is received, i.e., induced in the toroidal winding 412 and fed through signal filter 412A. The switching circuit serves to shunt a condenser 415 across condenser 312 so as to control the frequency of such first repeater station. Otherwise the circuitry of the repeater station is as described in FIGURE 7 wherein corresponding elements have identical reference numbers.

In the operation of the modified arrangement shown in FIGURES 9 and 10, when the multivibrator 400 is on, the transmitter shown in FIGURE 9 sends out a 200 cycle note to the detector and the demodulator in the first repeater station (FIGURE 10), which switches the capacitor 415 in the oscillator and locks it in at a low frequency. When the multivibrator is off, the transmitter is off, the switch 410A in the first repeater station is off, and the oscillator operates at a higher frequency. The detection system at the surface is the same as that shown in FIGURE 7.

The use of transistors allows the use of low energizing voltages which may be derived from small D.C. batteries. Such voltages may be obtained by other means, for example, by making parts of the drill stem of dissimilar materials and using, for that purpose, the electromotive force between them. Using the drilling mud which is in contact with such dissimilar materials as an electrotyle, the repeater stations as well as the transmitting stations can be powered from such potential differences. For instance, if one electrode were of magnesium, which stands at plus 2.40 volts in the electromotive series of elements, and gold, having a potential of minus 1.5 volts, was used as the other electrode, almost four volts at one junction is derived for powering the transistor apparatus. Electrolytic conditions within a well are suitable for such operations, particularly since the drill pipe is rotating and the electrodes are continually wiped clean by the walls of the well, and thus there would be little likelihood of polarization setting in.

While the particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

I claim:

1. In a system of the character described for indicating the spontaneous potential of a formation engaged by a drill string, said drill string comprising an element of a single electrical turn through which current flows in accordance with the spontaneous potential of said formation, and means magnetically coupled to said turn for detecting said current.

2. In a system of the character described for indicating the spontaneous potential between an element of a drill string and the formation engaged by said drill string, a magnetic core on said string in the magnetic field produced by current flowing through the formation as the result of said potential and having a magnetic characteristic thereof changeable in accordance with said current, and means for indicating the change in said magnetic characteristic which occurs as a result of said current.

3. In a well signaling system, the combination comprising a drill string terminating in a bit for engaging a formation, a magnetic core encircling said string in close proximity to said bit so that an earth current produced by the spontaneous potential between said bit and said formation may flow through a path which is embraced by said core to change a magnetic characteristic of the same in accordance with the intensity of said current, and means for indicating the change in said magnetic characteristic produced by said current.

4. In a system of the character described for indicating the condition of a formation engaged by an elongated metallic member extending into a well bore defined by a formation and engaging the sides thereof to produce a current flow and resulting magnetic field in accordance with the spontaneous potential of said formation, a first magnetic core in said magnetic field and having a characteristic thereof changeable in accordance with said current, a second magnetic core, means energizing said first magnetic core and producing a first electrical quantity which varies in accordance with said current, adjustable means energizing said second magnetic core and producing a second electrical quantity, said adjustable means being adjustable to adjust said first quantity in relationship to said second quantity.

5. In a system of the character described for indicating the spontaneous potential of a formation engaged by an elongated metallic member extending into a well bore defined by a formation and engaging the sides thereof, means magnetically associated with said member and responsive to current which flows as a result of said spontaneous potential in a path that includes said member and said formation for indicating the voltage between said member and said formation, means magnetically associated with said member and responsive to current which flows in a path that includes said member and said formation for indicating the current flow in said path, whereby the resistance of said formation may be calculated from the voltage and current thus indicated.

6. In a system of the character described for indicating the condition of a formation engaged by a drill string, a magnetic core mounted on the drill string, said drill string comprising, with the formation engaged thereby, a single turn which is magnetically coupled to said core to alter a magnetic characteristic of the core, a winding on said core, means energizing said winding with continuous current to condition said magnetic core, means energizing said winding with a varying current, and means for indicating changes in said varying current which are due to formation current flowing in said single turn.

7. In a system of the character described for indicating the spontaneous potential of a formation engaged by a drill string entering into a well bore, magnetic core means mounted on said drill string and having a magnetic characteristic thereof changed in accordance with the flow of current through said formation resulting from said spontaneous potential, and means for detecting the change in said magnetic characteristic and producing an indication of the spontaneous potential existing between said drill string and said formation.

8. In a system of the character described for indicating the condition of a formation engaged by a drill string extending into a well bore, a first magnetic core mounted on said drill string, said drill string comprising a current path for formation current, said path comprising a single turn magnetically coupled to said core with the formation current in said turn serving to alter the condition of said magnetic core, a first coil on said core having one of its terminals connected to said drill string, a conductor passing up through said drill string to the surface and connected to the other terminal of said coil, a source of continuous current connected to said conductor and producing a flow of continuous current through said winding to condition said first core, a source of varying voltage connected to said conductor for producing a varying current through said coil, said varying current varying in accordance with the intensity of current flowing through said single turn, a second magnetic core substantially identical with said first core, a second coil on said second core substantially identical with said first coil, means supplying a like continuous current and varying current to said second coil, and means comparing the variation in said varying current in said first coil with variations in said varying current in said second coil.

9. In a system of the character described wherein it is desired to measure simultaneously the resistivity and spontaneous potential in a well bore being drilled by a drill bit at the end of a drill string, the steps comprising, conductively connecting said drill bit to said drill string so as to allow a current responsive to said spontaneous potential to flow in a path which includes only the drill bit, adjacent drill string and the surrounding formations of said well bore, and inductively inducing in the vicinity of said drill bit a secondary current for measuring said current responsive to said spontaneous potential.

10. In a system of the character described wherein it is desired to measure simultaneously the resistivity and spontaneous potential in a well bore being drilled by a drill bit at the end of a drill string with a magnetic core structure encircling said drill string the steps comprising, conductively connecting said drill bit to said drill string so as to allow a current responsive to said spontaneous potential to flow in a path which includes the drill bit, drill string and the surrounding formations of the well bore with such current flowing in a portion of the drill string which is embraced by said core structure, and operating said core structure in a magnetic saturated condition in the presence of said current.

11. In a system of the character described wherein a magnetic core is mounted on a drill string through which formation current flows as a result of spontaneous potential of the formation at the end of said drill string, the steps comprising energizing said core structure with an undulatory magnetic flux, and indicating the changed condition of the magnetized state of said core structure as a result of such formation current.

12. In a method of the character described for indicating spontaneous current flowing through a drill string adjacent to the bit in which said current passes through a toroidal ferromagnetic core so as to produce a magnetic bias in said ferromagnetic material, the step comprising electrically measuring said magnetic bias to determine said spontaneous current.

13. The method for indicating the electrical potentials spontaneously set up when a hole is drilled through the earth by a drill string which includes a toroid in close proximity to the drill bit and axially aligned therewith, comprising measuring the resulting electrical current thus produced flowing through the drill string adjacent to the bit, by measuring the magnetizing force set up in said toroid due to said current.

14. The method for indicating the electrical potentials spontaneously set up when a hole is drilled through the earth by a drill string which includes a toroid in close proximity to the drill bit and axially aligned therewith, comprising measuring the resulting electrical current thus produced flowing through the drill string adjacent to the bit, by measuring the magnetizing force set up in said toroid due to said current by exciting said toroid with an alternating current and measuring the distortion caused by said magnetizing force of said alternating current and using said distortion to indicate current caused by said spontaneous potential.

15. The method for indicating the electrical potentials spontaneously set up when a hole is drilled through the earth by a drill string which includes a toroid in close proximity to the drill bit and axially aligned therewith, comprising measuring the resulting electrical current thus produced flowing through the drill string adjacent to the bit, by measuring the magnetizing force set up in said toroid due to said current by exciting said toroid with an alternating current and measuring the distortion caused by said magnetizing force of said alternating current and using said distortion to indicate current caused by said spontaneous potential and measuring the alternating potential to determine the electrical impedance of the earth surrounding the bit.

16. The method for indicating the electrical potentials spontaneously set up when a hole is drilled through the earth by a drill string which includes a toroid in close proximity to the drill bit and axially aligned therewith, comprising measuring the resulting electrical current thus produced flowing through the drill string adjacent to the bit, by measuring the magnetizing force set up in said toroid due to said current by exciting said toroid with an alternating current and measuring the distortion caused by said magnetizing force of said alternating current and using said distortion to indicate current caused by said spontaneous potential and simultaneously measuring the alternating potential to determine the electrical impedance of the earth surrounding the bit.

17. In a system of the character described in which a drill string including a drill bit traverses a bore hole, localized means located in close proximity to said drill bit and responsive to the spontaneous current flowing through said drill string and drill bit, said current being representative of the difference between said spontaneous potential and the average potential of the entire drill string, and means indicating said spontaneous current.

18. In a system of the character described for indicating the condition of a formation engaged by a drill string extending into a well bore, a first magnetic core mounted on said drill string, said drill string comprising a current path for formation current, said path comprising a single turn magnetically coupled to said core with the formation current in said turn serving to alter the condition of said magnetic core, a first coil on said core having one of its terminals connected to said drill string, a conductor passing up through said drill string to the surface and connected to the other terminal of said coil, a source of continuous current connected to said conductor and producing a flow of continuous current through said winding to condition said first core, a source of varying voltage connected to said conductor for producing a varying current through said coil, said varying current varying in accordance with the intensity of current flowing through said single turn, a second magnetic core substantially identical with said first core and mounted outside of said well bore, a second coil on said second core substantially identical with said first coil, means supplying a like continuous current and varying current to said second coil, and means comparing the variation in said varying current in said first coil with variations in said varying current in said second coil.

19. In a system of the character described for indicating the condition of a formation engaged by a drill string extending into a well bore, a first magnetic core mounted on said drill string, said drill string comprising a current path for formation current, said path comprising a single turn magnetically coupled to said core with the formation current in said turn serving to alter the condition of said magnetic core, a first coil on said core having one of its terminals connected to said drill string, a conductor passing up through said drill string to the surface and connected to the other terminal of said coil, a source of continuous current connected to said conductor and producing a flow of continuous current through said winding to condition said first core, a source of varying voltage connected to said conductor for producing a varying current through said coil, said varying current varying in accordance with the intensity of current flowing through said single turn, a second magnetic core substantially identical wtih said first core, a second coil on said second core substantially identical with said first coil, means supplying a like continuous current and varying current to said second coil, adjustable means to adjust the intensity of the continuous current through said second coil to produce a variation in said varying current in said second coil which is substantially equal to the variation in said varying current in said first coil produced by formation current flowing through said single turn, and means comparing the variation in said varying current in said first coil with variations in said varying current in said second coil.

20. In a system of the character described for indicating the condition of a formation engaged by a drill string extending into a well bore, a first magnetic core mounted on said drill string, said drill string comprising a current path for formation current, said path comprising a single turn magnetically coupled to said core with the formation current in said turn serving to alter the condition of said magnetic core, a first coil on said core having one of its terminals connected to said drill string, a conductor passing up through said drill string to the surface and connected to the other terminal of said coil, a source of continuous current connected to said conductor and producing a flow of continuous current through said winding to condition said first core, a source of varying voltage connected to said conductor for producing a varying current through said coil, said varying current varying in accordance with the intensity of current flowing through said single turn, a second magnetic core substantially identical with said first core, a second coil on said second core substantially identical with said first coil, means supplying a like continuous current and varying current to said second coil, adjustable means to adjust the intensity of the continuous current through said second coil to produce a variation in said varying current in said second coil which is substantially equal to the variation in said varying current in said first coil produced by formation current flowing through said single turn, said second core and coil structure being compensated for temperature to produce variations in said varying current which are substantially identical to those variations produced in said first coil, and means comparing the variation in said varying current in said first coil with variations in said varying current in said second coil.

21. In a system of the character described for indicating the condition of a formation engaged by a drill string extending into a well bore, a first magnetic core mounted on said drill string, said drill string comprising a current path for formation current, said path comprising a single turn magnetically coupled to said core with the formation current in said turn serving to alter the condition of said magnetic core, a first coil on said core having one of its terminals connected to said drill string, a conductor passing up through said drill string to the surface and connected to the other terminal of said coil, a source of continuous current connected to said conductor and producing a flow of continuous current through said winding to condition said first core, a source of varying voltage connected to said conductor for producing a varying current through said coil, said varying current varying in accordance with the intensity of current flowing through said single turn, a second magnetic core substantially identical with said first core, a second coil on said second core substantially identical with said first coil, means supplying a like continuous current and varying current to said second coil, the continuous current flow through both said first coil and said second coil being maintained substantially constant, and means comparing the variation in said varying current in said first coil with variations in said varying current in said second coil.

22. In a system of the character described for indicating the spontaneous potential between an element of a drill string and the formation engaged by said drill string, a magnetic core on said string in the magnetic field produced by current flowing through the formation as the result of said potential and having a magnetic characteristic thereof changeable in accordance with said current, a multivibrator having an "on" time and an "off" time, means coupling said magnetic core to said multivibrator to change the "on" and "off" time of said multivibrator, and means for indicating the change in said magnetic characteristic which occurs as a result of said current, said indicating means being responsive to the "on" and "off" time of said multivibrator.

23. In a system of the character described for indicating the spontaneous potential between an element of a drill string and the formation engaged by said drill string, a magnetic core on said string in the magnetic field produced by current flowing through the formation as the result of said potential and having a magnetic characteristic thereof changeable in accordance with said current, a multivibrator having an "on" time and an "off" time, means coupling said magnetic core to said multivibrator to change the "on" and "off" time of said multivibrator, means for indicating the change in said magnetic characteristic which occurs as a result of said current, said indicating means being responsive to the "on" and "off" time of said multivibrator, a first repeater station including an oscillator and means for adjusting the frequency of said oscillator in accordance with the "on" and "off" time of said multivibrator.

24. In a system of the character described for indicating the spontaneous potential between an element of a drill string and the formation engaged by said drill string, a magnetic core on said string in the magnetic field produced by current flowing through the formation as the result of said potential and having a magnetic characteristic thereof changeable in accordance with said current, a multivibrator having an "on" time and an "off" time, means coupling said magnetic core to said multivibrator to change the "on" and "off" time of said multivibrator, means for indicating the change in said magnetic characteristic which occurs as a result of said current, said indicating means being responsive to the "on" and "off" time of said multivibrator, a first repeater station including an oscillator and means for adjusting the frequency of said oscillator in accordance with the "on" and "off" time of said multivibrator, a second repeater station spaced a substantial distance from said first repeater station, a magnetic core in said first repeater station encircling said drill string, and a magnetic core at said second repeater station encircling said drill string and in magnetic inductive relationship with respect to the magnetic core at said first repeater station.

25. In a system of the character described for indicating the spontaneous potential between an element of a drill string and the formation engaged by said drill string, a magnetic core on said string in the magnetic field produced by current flowing through the formation as the result of said potential and having a magnetic characteristic thereof changeable in accordance with said current, a winding on said magnetic core, means for indicating the change in said magnetic characteristic which occurs as a result of said current, and a conducting cable connecting said winding to said indicating means.

26. In a system of the character described for indicating the spontaneous potential between an element of a drill string and the formation engaged by said drill string, a magnetic core on said string in the magnetic field produced by current flowing through the formation as the result of said potential and having a magnetic characteristic thereof changeable in accordance with said current, a winding on said magnetic core, means for indicating the change in said magnetic characteristic which occurs as a result of said current, and a conductive sleeve inside said drill string and connecting said winding to said indicating means.

27. In a system of the character described in which a drill string including a drill bit traverses a bore hole, a toroid located in the drill collar of the drill string and in close proximity to said drill bit and responsive to the spontaneous current flowing through said drill string and drill bit, said current being representative of the difference between said spontaneous potential and the average potential of the entire drill string, and means indicating said spontaneous current.

References Cited in the file of this patent

UNITED STATES PATENTS

| | | |
|---|---|---|
| 1,825,514 | Fitzgerald | Sept. 29, 1931 |
| 1,896,737 | Zuschlag | Feb. 7, 1933 |
| 2,153,378 | Kramer | Apr. 4, 1939 |
| 2,196,314 | Lee | Apr. 9, 1940 |
| 2,214,786 | Bishop | Sept. 17, 1940 |
| 2,249,769 | Leonardon | July 22, 1941 |
| 2,354,887 | Silverman | Aug. 1, 1944 |
| 2,370,818 | Silverman | Mar. 6, 1945 |
| 2,389,241 | Silverman | Nov. 20, 1945 |
| 2,411,696 | Silverman | Nov. 26, 1946 |
| 2,568,241 | Martin | Sept. 18, 1951 |
| 2,605,302 | Specht | July 29, 1952 |
| 2,622,124 | Homer | Dec. 16, 1952 |
| 2,633,535 | Daskam | Mar. 31, 1953 |
| 2,728,047 | Doll | Dec. 20, 1955 |
| 2,755,434 | Yetter | July 17, 1956 |
| 2,924,788 | Maurushat | Feb. 9, 1960 |

UNITED STATES PATENT OFFICE
CERTIFICATE OF CORRECTION

Patent No. 3,079,549            February 26, 1963

Philip W. Martin

It is hereby certified that error appears in the above numbered patent requiring correction and that the said Letters Patent should read as corrected below.

Column 4, line 22, for "magentic" read -- magnetic --; column 7, line 16, for "conditions" read -- condition --; line 19, for "alternatnig" read -- alternating --; line 53, after "line" insert -- or --; same column 7, line 55, after "terminal" insert -- of --; column 13, line 20, for "not" read -- note --; line 46, for "electrotyle" read -- electrolyte --; column 17, line 10, for "wtih" read -- with --.

Signed and sealed this 19th day of November 1963.

(SEAL)

Attest:
ERNEST W. SWIDER

Attesting Officer

EDWIN L. REYNOLDS

Acting Commissioner of Patents